US008644852B2

(12) United States Patent
Jones et al.

(10) Patent No.: US 8,644,852 B2
(45) Date of Patent: Feb. 4, 2014

(54) METHOD AND SYSTEM FOR CAPTURING AND PROVIDING TYPOLOGICAL AND CONTEXTUAL INFORMATION ABOUT A LOCATION BASED ON WIRELESS BEACONS

(71) Applicant: Skyhook Wireless, Inc., Boston, MA (US)

(72) Inventors: Russel K. Jones, Medfield, MA (US); Richard J. Sutton, Cambridge, MA (US)

(73) Assignee: Skyhook Wireless, Inc., Boston, MA (US)

(*) Notice: Subject to any disclaimer, the term of this patent is extended or adjusted under 35 U.S.C. 154(b) by 0 days.

(21) Appl. No.: 13/674,382

(22) Filed: Nov. 12, 2012

(65) Prior Publication Data

US 2013/0260797 A1    Oct. 3, 2013

Related U.S. Application Data

(60) Provisional application No. 61/558,179, filed on Nov. 10, 2011.

(51) Int. Cl.
*H04W 24/00* (2009.01)

(52) U.S. Cl.
USPC ............... 455/456.1; 455/456.3; 370/252

(58) Field of Classification Search
USPC ............... 455/453, 456.3; 370/252, 229, 230
See application file for complete search history.

(56) References Cited

U.S. PATENT DOCUMENTS

2012/0314587 A1* 12/2012 Curticapean ............... 370/252
2013/0035110 A1* 2/2013 Sridhara et al. ............ 455/456.1

* cited by examiner

*Primary Examiner* — Phuoc H Doan
(74) *Attorney, Agent, or Firm* — Wilmer Cutler Pickering Hale and Dorr LLP

(57) ABSTRACT

Systems and methods for providing contextual information about a place within a range of a wireless signal beacon are provided. A reference database of wireless beacons stores attributes associated with wireless beacons. Wireless-enabled devices and/or server systems receive information identifying wireless beacons in range of the wireless-enabled devices and determine a received signal strength indication of the wireless beacons. The wireless-enabled devices and/or server systems then retrieve from the reference database extended attributes that are associated with the wireless beacons and determine at least one associated contextual attribute about the place within range of the wireless beacons.

21 Claims, 23 Drawing Sheets

METHOD AND SYSTEM FOR CAPTURING AND PROVIDING TYPOLOGICAL AND CONTEXTUAL INFORMATION ABOUT A LOCATION BASED ON WIRELESS BEACONS

CROSS-REFERENCE TO RELATED APPLICATIONS

This application claims the benefit under 35 U.S.C. §119 (e) to U.S. Provisional Patent Application No. 61/558,179, entitled METHOD AND SYSTEM TO CAPTURE AND PROVIDE TYPOLOGICAL INFORMATION BASED ON WIRELESS BEACONS, filed on Nov. 10, 2011, the contents of which are incorporated by reference herein.

BACKGROUND OF THE INVENTION

1. Field of the Invention

The invention generally relates to providing typological and contextual information about a place derived from wireless beacon properties.

2. Description of Related Art

Reverse geocoding makes use of the geospatial information associated with a point in space to determine specific typological and contextual information such as the civic address of a latitude and longitude pair. Reverse geocoding relates to the process of back (reverse) coding of a point location (latitude, longitude) to a readable address or place name. It has also traditionally been defined as "the process of deriving the location of the nearest road segment to a point with the specified longitude/latitude." Given an arbitrary point, the challenge is to return typological and contextual attributes associated with that point in space. Traditionally this has been focused on resolving street address information which could then be used for tasks such as navigation planning. As location-based services have become more varied and widely adopted, additional uses for reverse geocoding have come into existence. For example, there are now services from vendors such as GeoNames, Microsoft's Bing and CloudMade that offer the ability to find the closest intersection or the Wikipedia entries for items close to the geographic point. Traditional reverse geocoding services operate by executing a spatial search on information within a specialized database containing place names and street address information. Based on proximity, the most appropriate address/name is chosen. This works well for certain uses of reverse geocoding. However, there are a number of capabilities that existing models fails to achieve.

In particular, current models for reverse geocoding are not reliable for determining, for example, whether a point is located in the building or outside, or on which floor or in which specific room. Additionally, differentiating between several entities with a single civic address is a challenge for traditional reverse geocoding systems. Also, reverse geocoding systems rely on the latitude and longitude of a point, excluding the possibility of determining information about a place that changes in time or in physical space.

An example of a previous location system, the Cricket Indoor Location System, implemented a method by which arbitrary character strings were emitted as part of the beacon for the specially built hardware used by the Cricket System. These arbitrary character strings could be used to encode location and context information about each beacon. However, this "location" information requires an understanding of context and meaning that is encoded in the character string and is limited to small-scale deployments within a building.

The Cricket system relies on non-standard hardware and communications protocols. In addition, the information that is broadcast to all clients must be maintained within the configuration of each beacon. Lastly, this method relies on the ability of each client device to be able to interpret and determine the context of the broadcast character string to determine its meaning.

Another reverse geocoding prior art system is described in U.S. Patent Publication No. 2007/0191029. This patent publication describes an enhancement to what they refer to as "conventional reverse geocoding" in which additional capabilities are provided through the use of accuracy measurements as well as geospatial bounding areas to provide better accuracy in determining the appropriate response for a given request. This method is tangential to the present invention in that both methods can be used to improve the accuracy and specificity of reverse geocoding information for a given request.

The present invention overcomes current shortcomings in existing positioning and reverse geocoding systems. For example, according to embodiments of the present invention, methods and systems can indicate, for example, the particular building floor and room a device or user is located at. According to alternative embodiments, the invention discloses systems and methods that can identify an exhibit or an aisle to which a user is positioned closest.

The present invention provides geocoding capabilities for indoor positioning scenarios, as well as outdoor positioning scenarios. For example, according to embodiments of the present invention, systems and methods can indicate what section of a park a person is in, what neighborhood or area of a campus a person is currently in, or what specific part of a large moving vehicle, such as a ship or a train a person is located in.

The scenarios discussed above are merely illustrative. Numerous other scenarios could be imagined for using an arbitrary set of tags to identify useful information based on the described system.

SUMMARY OF THE INVENTION

Under one aspect of the invention, systems and methods for providing contextual information about a place within a range of a wireless signal beacon are provided. A method includes at least one of the wireless-enabled device and a server system in communication with the wireless-enabled device receiving information identifying at least one wireless beacon in range of the wireless-enabled device and determining a received signal strength indication of the at least one wireless beacon. The method further includes at least one of the wireless-enabled device and the server system in communication with the wireless-enabled device retrieving from a reference database of wireless beacons that stores attributes associated with the wireless beacons, extended attributes that are associated with the at least one wireless beacon and at least one of the wireless-enabled device and a server system in communication with the wireless-enabled device determining at least one associated contextual attribute about the place within range of the at least one wireless beacon.

Under another aspect of the invention, determining of the at least one contextual attribute is based on the received signal strength indication of the at least one wireless beacon.

Under another aspect of the invention, determining of the at least one contextual attribute is based on the received signal strength indication of the at least one wireless beacon and a clustering algorithm.

Under another aspect of the invention, determining of the at least one contextual attribute is based on the received signal strength indication of the at least one wireless beacon and an approximate string match algorithm.

Under another aspect of the invention, determining of the at least one contextual attribute further includes use of standard reverse geocoding attributes.

Under another aspect of the invention, determining of the at least one contextual attribute is further based on at least one of an estimated location of the wireless-enabled device, an estimated error of the location of the wireless-enabled device, latitude and longitude coordinates of the place, and an address of the place.

Under another aspect of the invention, the at least one contextual attribute includes at least one of a civic address of a venue, a name of the venue, an owner of the venue, a size of the venue, and hours of operation of the venue.

Under another aspect of the invention, the at least one contextual attribute includes at least one of a room number, an office number, a building name, a wing name, a floor number, an exhibit name, a bus number, and a business name.

Under another aspect of the invention, a server system for providing contextual information about a place within a range of a wireless signal beacon is provided. The server system is in communication with a reference database of wireless beacons that stores extended attributes associated with the wireless beacons, and comprises receiving means for receiving from a wireless-enabled device in communication with the server system information identifying at least one wireless beacon in range of the wireless-enabled device, a wireless beacon identifier and a received signal strength indication of the at least one wireless beacon in range of the wireless-enabled device, retrieving means for retrieving from the reference database extended attributes that are associated with the at least one wireless beacon, determining means for determining at least one associated contextual attribute about the place within range of the at least one wireless beacon.

Under another aspect of the invention, a method for maintaining a reference database of beacons and associated place attributes comprises estimating a geographic location of at least one beacon, defining a spatial buffer around the estimated location of the at least one beacon, identifying at least one point of interest (POI) within the spatial buffer, comparing the at least one POI with the Service Set Identification (SSID) of the at least one beacon using an approximate string matching algorithm, and entering an associated place attribute corresponding to the at least one beacon based on the comparison of the at least one POI with the SSID.

Under another aspect of the invention, the spatial buffer can be an arbitrary 2-dimensional or 3-dimensional polygon, a circle, or a sphere.

Under another aspect of the invention, a method for automated acquisition and association of place attributes with beacons for use in a reference database comprises defining at least one point of interest and a first spatial boundary for the at least one point of interest, defining a second spatial boundary representing an area of influence for each point of interest, wherein the area of influence is determined by the expected signal reach of wireless beacons from within the first spatial boundary, retrieving from the reference database information identifying wireless beacons that are located within the second spatial boundary, performing a clustering algorithm on beacon identifiers that are located within the second spatial boundary, defining a cluster based on the performed clustering algorithm, the cluster containing identified wireless beacons, and assigning associated point of interest attributes as place attributes to each identified wireless beacon in the defined cluster.

Under another aspect of the invention, the method for automated acquisition and association of place attributes with beacons for use in a reference database comprises, classifying the clustered wireless beacons as "inside a point of interest" if the set of clustered beacons are within the first spatial boundary, classifying the remaining clustered beacons as "at the point of interest" and assigning a new attribute to the place attribute database for all clustered beacons.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF THE INVENTION

According to aspects of the present disclosure, methods and systems use a beacon database to provide highly detailed locative and descriptive capabilities to reverse geocoding, herein referred to as a Beacon Anchored Reverse Geocoding Extension (BARGE). The extension can include, for example, additional details as room number, building name, wing name, floor number, exhibit name, bus number, office number, business name, etc. The set of attributes can be arbitrarily extended through the use of name/value pairs containing the name of the field and the value of the field for any given beacon or via a tagging system. The current invention extends the concept of reverse geocoding to provide information about a particular location with or without the actual geospatial coordinates of the location in question.

Providing information about a "location" is often necessary for purposes of navigation and providing human readable context related to a given location. Traditionally, given a latitude and a longitude pair of coordinates, reverse geocoding systems determine attributes such as the civic address closest to that location. Herein, we use the term "location" to denote a specific point or area based on proximity to a set of geospatial coordinates. However, the term "place" is defined herein as a "physical environment" to distinguish the area or environment that is currently at a given location. For example, a person could be located at the latitude/longitude coordinates of 42.359483, −71.06612 but be placed in Bus Number 37.

Figure 1:
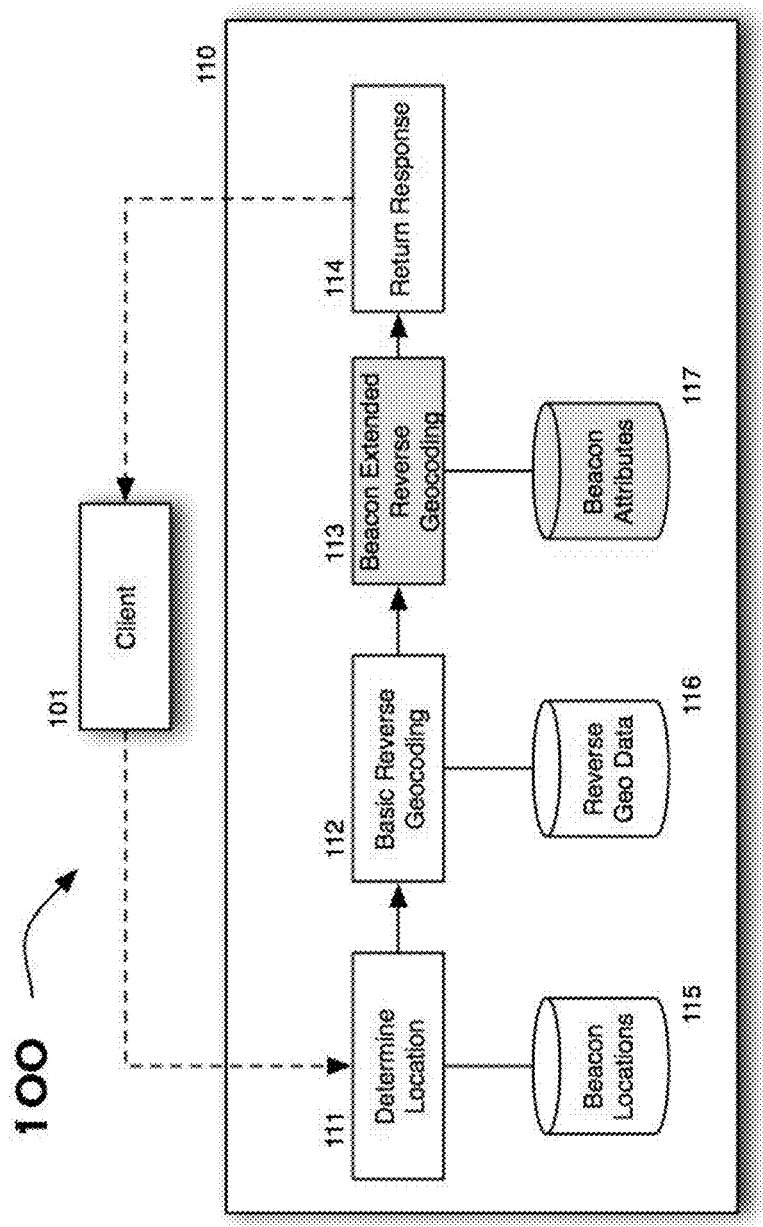
FIG. 1 depicts an exemplary configuration of a reverse geocoding system according to aspects of the present disclosure.

The present invention makes use of wireless beacons, such as Wi-Fi access points, to associate place information to compliment location information that can be provided by traditional reverse geocoding systems. FIG. 1 depicts a flow diagram of one possible configuration of the current invention [113, 117] used in conjunction with a positioning system [111, 115] and a traditional reverse geocoding system [113, 117] to produce a combined output [114], according to aspects of the present disclosure.

Beacons such as Wi-Fi access points emit a unique key that identifies each individual access point. This information has been shown to be useful for Wireless Positioning Systems such as described in U.S. Pat. No. 7,515,578, entitled "Estimation of Positioning using WLAN Access Point Radio Propagation Characteristics in a WLAN Positioning System." According to aspects of the present disclosure, the same beacon information can be used to determine an extended set of place typography and context.

According to aspects of the present disclosure, a client device such as a mobile smart phone acquires the beacon identities and signal strengths that are in range of the client device. This information is transmitted to a computer system. The beacon identities are used to look up attributes that are associated with one or more of the beacons. Algorithms are then used to determine the best match to the set of available attributes and this information is then added to the returned geolocation information.

The beacon anchored attribute reverse geocoding extension process can occur independently or in tandem with both a wireless positioning system and a traditional reverse geocoding system.

One advantage of this invention is the ability to include the orthogonal and complimentary verification of location. For example, if the information from the standard reverse geolocation function does not match the information from the extended reverse geolocation function, additional action can be taken to determine which set of information is correct or to simply adjust the confidence in the location based on the discrepancy. Additionally, if no information is available from a traditional reverse geocoding system, the BARGE information can provide the necessary place typology and contextual information.

Another advantage of the current invention is the ability to provide an extensible list of attributes based on needs of the system and application. A baseline of attributes which identify the common scenarios is provided by default. However, additional attributes can be added that meet a particular need. For example, if the disclosed systems and methods were applied to a zoo, the 'exhibit' and 'cage' attributes could be added to the beacons in the zoo and thus exposed by an application for use within the zoo.

Yet another advantage of the current invention is the ability to scale to the vertical or z-dimension for reverse geocoding to provide floor level and vertical identification. Altitude is not the best indicator for floor in buildings due to a number of factors. For example the ground level floor must be established for each building, floors do not all the have same height, floors are not always numbered the same (for example some buildings do not have a 13th floor), and some floors are named instead of numbered (e.g. Lobby). Providing a context sensitive naming mechanism to indicate level avoids a coarse attempt to convert altitude to floor.

Additionally, according to embodiments of the present disclosure, the disclosed systems and methods provide the capability to provide place information independent of location information. For example, the BARGE information could indicate that a particular set of wireless beacons was located in the dining car of Train Number 365. The traditional reverse geocoding system could determine the location of that train is at the intersection of 1st and Main Street in a specific town, but would be unable to identify that it is a train or the fact that it is the dining car of that train.

Figure 2:
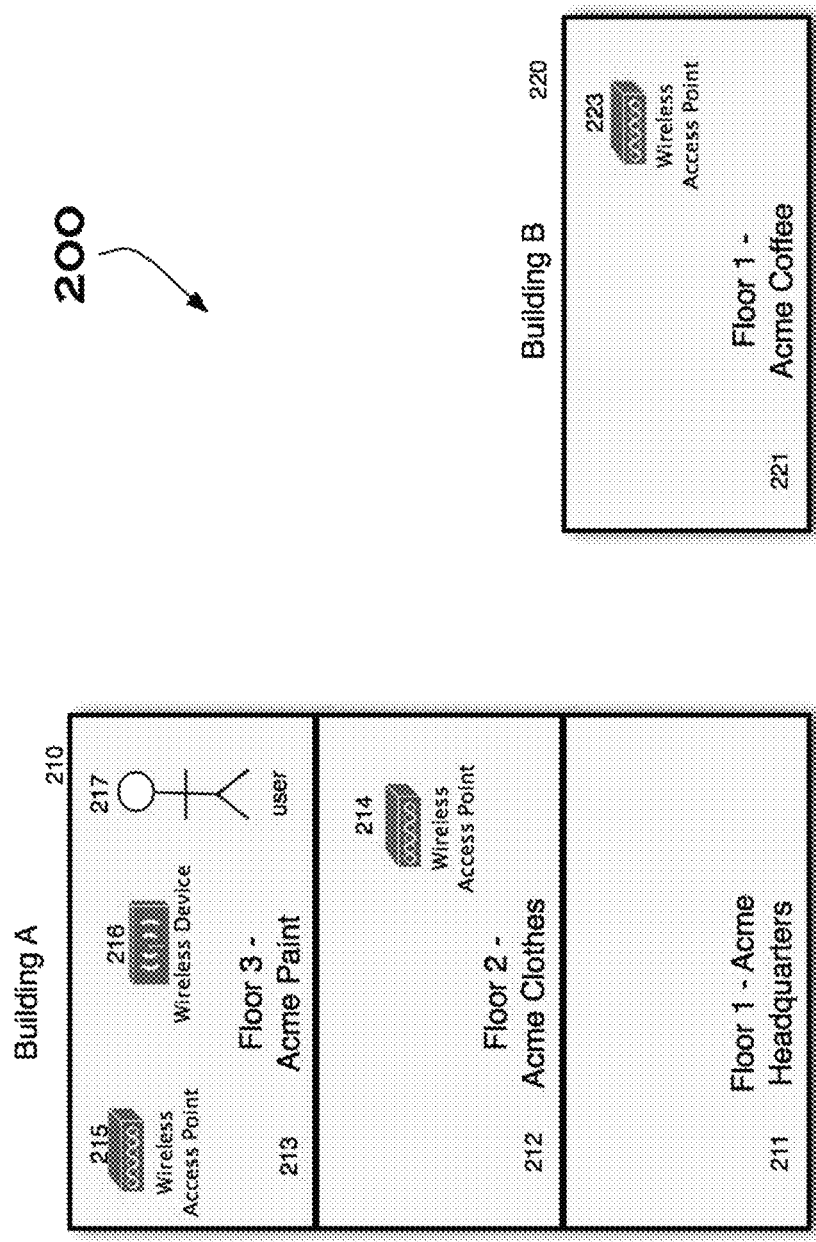
FIG. 2 shows an exemplary scenario of the system and methods of the present invention in use.

FIG. 2 illustrates exemplary embodiments of the disclosed invention. FIG. 2 depicts a scenario in which a user with a mobile device is on the 3rd floor [213] of a building (Building A [210]) containing an access point [215]. Located in the same building on the 2nd floor [212] is another access point [214]. Near Building A [210] is another building, Building B [220]. Building B contains an access point [223] on the 1st floor [221]. Given a user [217] with a wireless device [216] shopping at Acme Paint, the ideal results from a location service would include, for example, the identification of building (Building A), the identification of the venue (Acme Paint), and the identification of the floor (Floor 3).

In common reverse geocoding systems, the returned place information based on the latitude and longitude would consist of a civic address, for example a street address with city, postal code, state, and country. This information would be obtained by assuming that the location is at ground level. The civic address generally is going to be constrained to a postal address of the building or roadway intersection which resides closest to the resolved latitude and longitude. The addition of the BARGE system allows the overall location and positioning system to not only identify civic address level information but also provide contextually relevant information such as floor, wing, and room level details.

Figure 11:
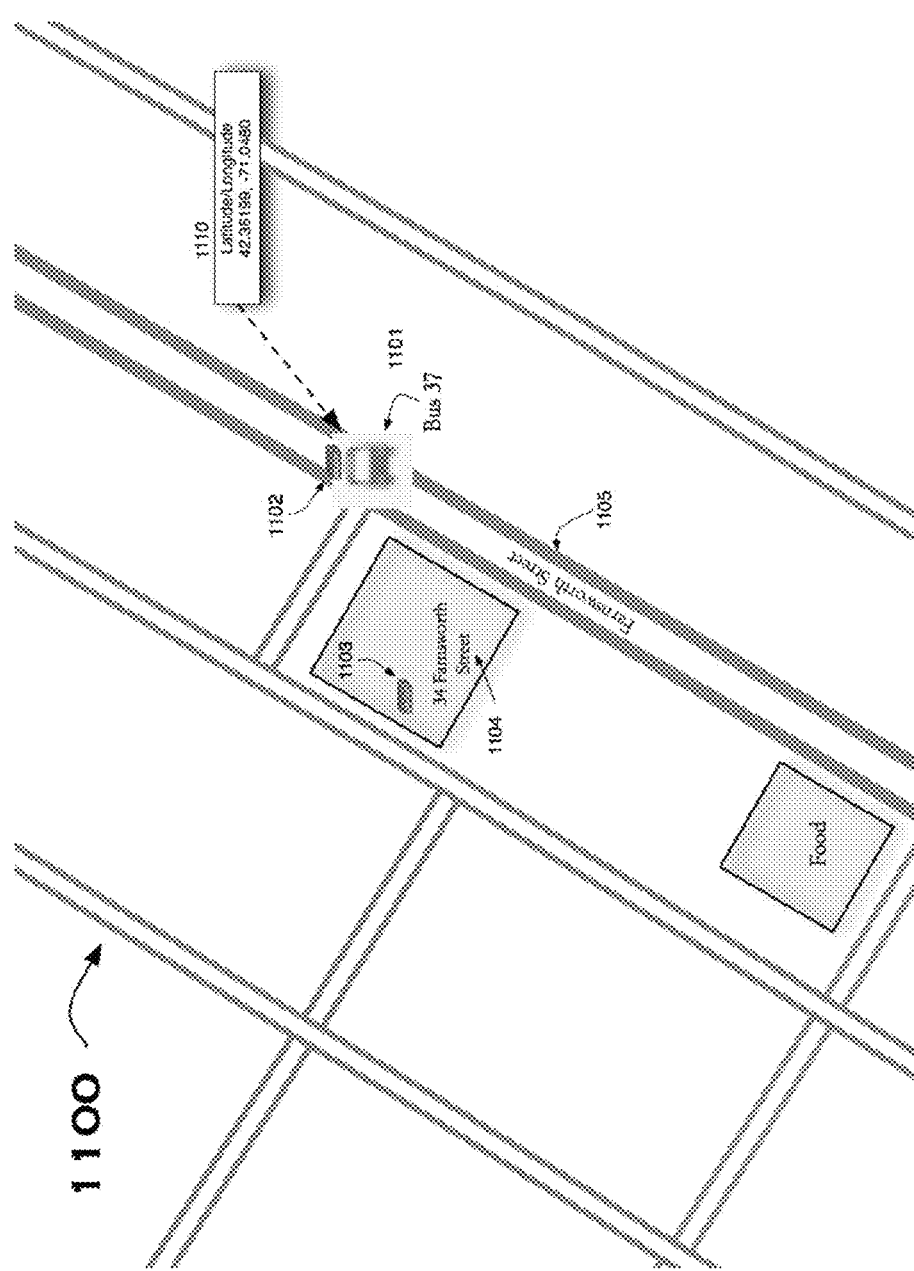
FIG. 11 depicts an exemplary BARGE system usage scenario of a device and place within a bus, according to aspects of the present disclosure.
Figure 12:
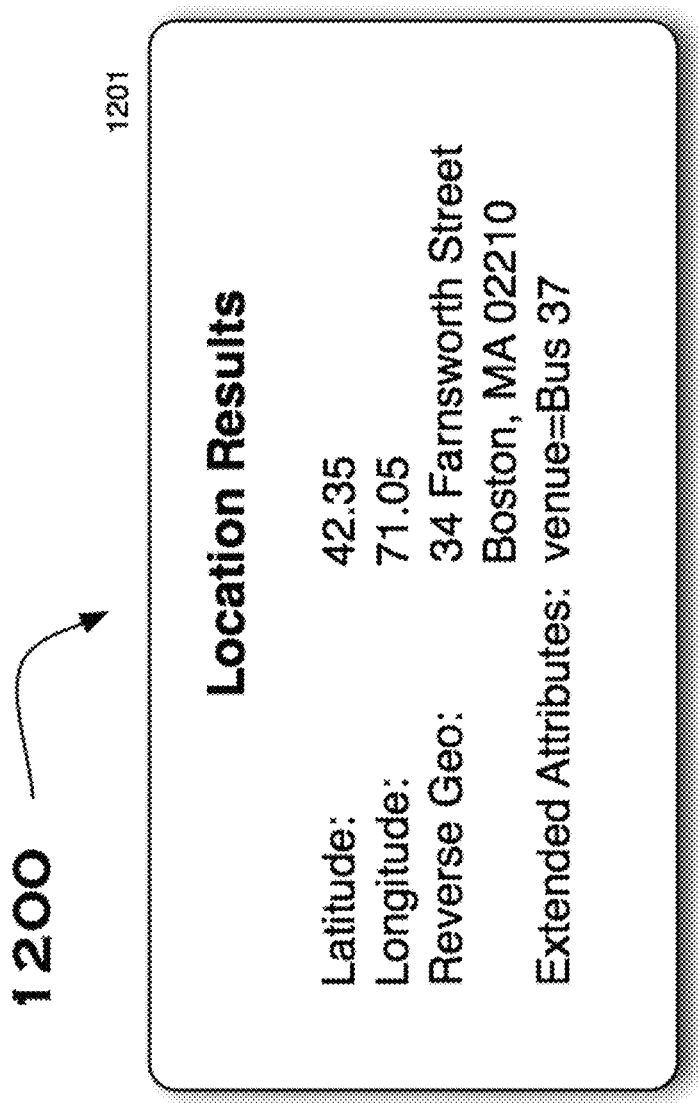
FIG. 12 shows exemplary expected location results, according to aspects of the present disclosure.

Indeed one of the advantages of the BARGE system is that it is not relegated to spatial relationships, as are traditional reverse geocoding systems. FIG. 11 shows a scenario in which a wireless beacon [1102] is installed within a mobile bus [1101]. A traditional location and reverse geocoding system would use the location [1110] to compute the street address [1104] nearest the latitude and longitude. The BARGE system allows for the identification of the fact that while the user is currently passing that address [1104], they are also on Bus 37 [1101], providing contextually relevant information about the "place" of the user in addition to the "location" information.

1. Acquisition of Reference Data to Build Reference Database

Attribute data must be gathered related to a set of beacons to provide the capability to determine the extended place attributes based on an input beacon key. General purpose positioning systems based on beacons (such as Wi-Fi positioning systems) use a unique identifier, for example, a Service Set Identification (SSID) or a MAC address, for each beacon which is linked in a database to the geographic location (e.g. latitude and longitude) of the approximate location of each beacon.

Unlike existing wireless positioning systems, the typological elements cannot be gathered simply by scanning the wireless frequencies. Many wireless positioning systems take advantage of the fact that wireless beacons are, by design, emitting their keys on a periodic basis, thus allowing automated large-scale scanning and categorization of these wireless devices. In contrast, typological information is not included in the beacons and thus must be attributed via an alternative method.

Preferred embodiments of the present invention provide a system and methodology for acquiring reference place typological and contextual data to enable extensions to a commercial reverse geocoding system using public and private 802.11 access points and other wireless beacons. The data is gathered in a programmatic way to enable large-scale and efficient coverage of features at a global scale. Certain embodiments allow additional attributes that are unable to be gathered and attributed in an automated fashion to be manually tagged, allowing for a high degree of specificity and variability in the information contained in these tagged attributes.

Place attributes are associated with specific beacons with each beacon having zero to any number of attributes. These attributes describe the location or place in which the beacon is located and any additional contextual information about the place in which the beacon is located.

There are several methods that can be used to acquire the necessary attribute data for the beacons. These generally fall into one of the two categories, manual or automated, as described below.

In one embodiment, the attributes for a given beacon are manually assigned. For example, beacon and attribute data may be collected on an ad-hoc basis by individual users through the use of a simple Web-based form, a mobile app, or via a programmatic interface to the location system. Such methods allow manual entry of the attribute data associated with a particular beacon.

In another embodiment, manual attribution is performed during a purposeful survey of an area whereby a person walks the area and identifies, for example, the floor, wing, building, and other attributes for each discovered beacon. Surveys such as these often occur within venues to provide positional accuracy as well as to generate accurate maps of a given indoor facility.

A solution to this problem is to provide an interface such as an API that can allow third parties to submit additional typological information which can be stored and related to a specific beacon. This API can then be exposed via a web form for individual attribution, via a mobile application, or via a programmatic API that allows large scale attribution by applications and beacon owners.

For example, a purposeful scan of a particular building could be accomplished by an individual by walking in the building and noting the location of beacons and labeling their location within a mobile application. This information could then be transmitted to the BARGE system via an API.

Each acquired beacon must contain the beacon key as well as any attributes that need to be associated with that beacon. This data, after submission, is stored in the system and made available for the BARGE system as discussed below.

2. Automated Acquisition of Attributes Based on SSID

According to embodiments of the present disclosure, methods of automated attribution are utilized. In this embodiment, automated attribution methods process the information available from the Wi-Fi access point such as the Service Set Identification (SSID). The SSID is a 32-byte string that is configured on the Access Point to provide human identifiable information about the beacon. This identifier text from Wi-Fi access points may contain information about the place in which the access point is located. For example, it may contain the name of the business, floor or organization hosting the beacon. Using heuristics and text-based processing combined with spatial filters, it is possible to retrieve relevant civic address, typological, and contextual information from the SSID.

According to embodiments of the present disclosure, the semi-automated process for determination of place attributes uses the following algorithm implemented by a computer system. In a system containing a database of Wi-Fi access points which includes the MAC address, the estimated location, and the SSID for each beacon, the system first filters out known default SSIDs. Default SSIDs are often set on devices by the manufacturers of the device and, in many instances, these default settings remain even after deployment in an operational mode.

After filtering the set of valid SSIDs, the system processes each Wi-Fi access point in the following way. First, a spatial buffer is created around the estimated location of the beacon. This buffer is typically in the order of tens to hundreds of meters in radius. The process then uses the spatial buffer applied to a spatial data set that contains points of interest (POI). These POIs may range from private to public venues or places. For example these may include restaurants, businesses, hotels, and government buildings. The names and attributes for the set of POIs that are intersected by the beacon buffer are chosen.

A series of text based matching algorithms are applied to the beacon's SSID to compare to all of the potential POI data. Examples of string matches include such methods as word matching from the POI data to the beacon's SSID and vice versa. In another embodiment, text based matching algorithms may involve partial word matches between the two sets of text strings. In yet another embodiment, an external database of common acronyms or related words may be applied to create a match. For example, external knowledge that one company is owned by another may be used to associate the parent company to the given access point based on this information.

Another embodiment of the invention makes use of the standard reverse geocoding information to ascertain additional information which may be useful to confirm or increase the confidence in a specific relationship. For example some SSIDs contain location information such as the city in which they are deployed. This can help confirm the SSID is related to a specific entity.

Figure 18:
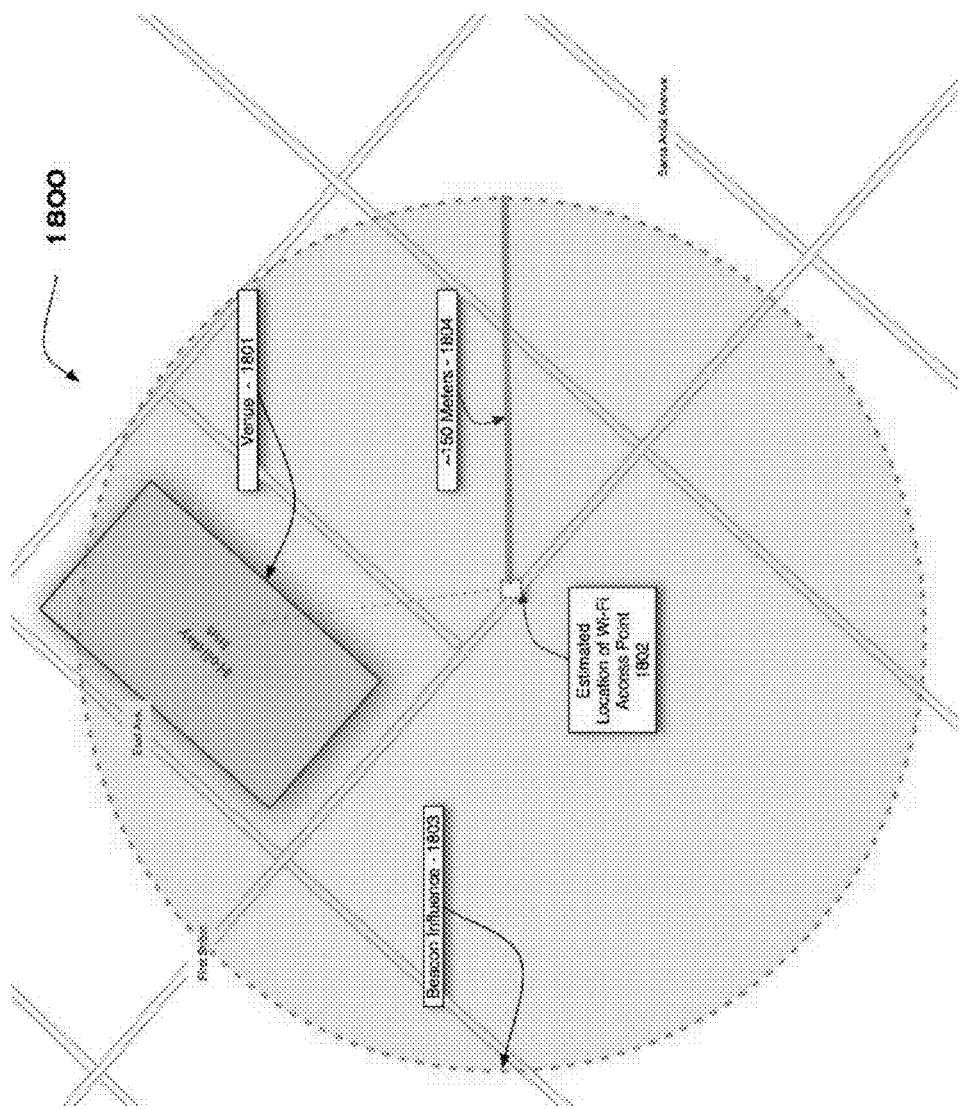
FIG. 18 depicts the process of using SSID information for automatic attribution of a place.
Figure 19:
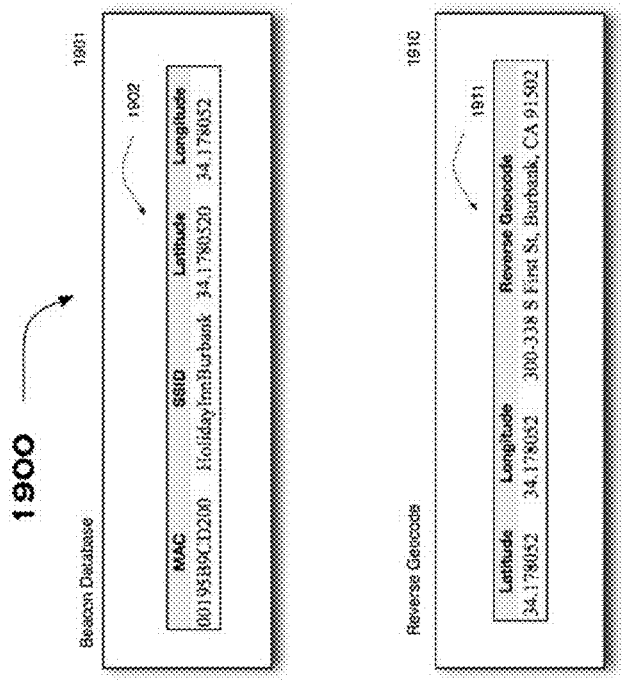
FIG. 19 illustrates an exemplary entry in a beacon database and an exemplary result from a conventional reverse geocoding system.

FIG. 18 shows an example of the algorithm in operation. In FIG. 18, a specific Wi-Fi beacon [1902] was chosen as shown in FIG. 19. This particular beacon contains the SSID, for example, of "HolidayInnBurbank" [1902].

The algorithm uses the latitude and longitude information for the beacon [1902, 1802] and applies, for example, a 150 meter radius spatial buffer around that point [1804]. This buffer represents the area of Beacon Influence [1803]. Points of interest within this buffer are acquired from a database of points of interest. For this example, a Holiday Inn hotel is returned from the database [1801].

In one embodiment of the invention, the two strings are compared, using various well known approximate or "fuzzy" string matching algorithms. In the example, a simple concatenation of the words in the POI will be found as an exact match within the SSID, indicating a likely match.

In another embodiment, the algorithm performs a reverse geocoding process on the beacon's location [1902]. The results of the reverse geocoding process can provide, for example, the values shown in the reverse geocoding results [1911]. The algorithm performs another series of approximate string matches to determine whether the reverse geocoding results corroborate the SSID string match. In this example, the word "Burbank" appears in both the SSID [1902] and the Reverse Geocode [1911].

The algorithm then assigns the attributes from the POI to the beacon, noting that this beacon is "at" the POI.

3. Automated Acquisition of Attributes Based on Spatial Clustering

In another embodiment, automatic attribution of place information can make use of spatial clustering of access points and spatial information about a business or venue within range to assign information about the business to the specific set of beacons that meet certain criteria.

Referring to FIGS. 14-17, the process is based on identifying initially a class or set of target venues to target. These could be specific types of venues (e.g. "big box" stores) or, for example, a specific company's venues. For each venue in the target set, the following steps are taken.

For example, for Venue A [1401], a Venue Radius [1403] is chosen. This may be pre-determined or it could be based on the spatial dimensions of the venue itself. Alternatively, the venue radius may be based on the class of venue. Generally, the Venue Radius is measured in tens to hundreds of meters. The Venue Radius defines "in venue" for purposes of this algorithm. The Venue Radius is used to produce a spatial buffer around the Venue Center [1402].

Figure 15:
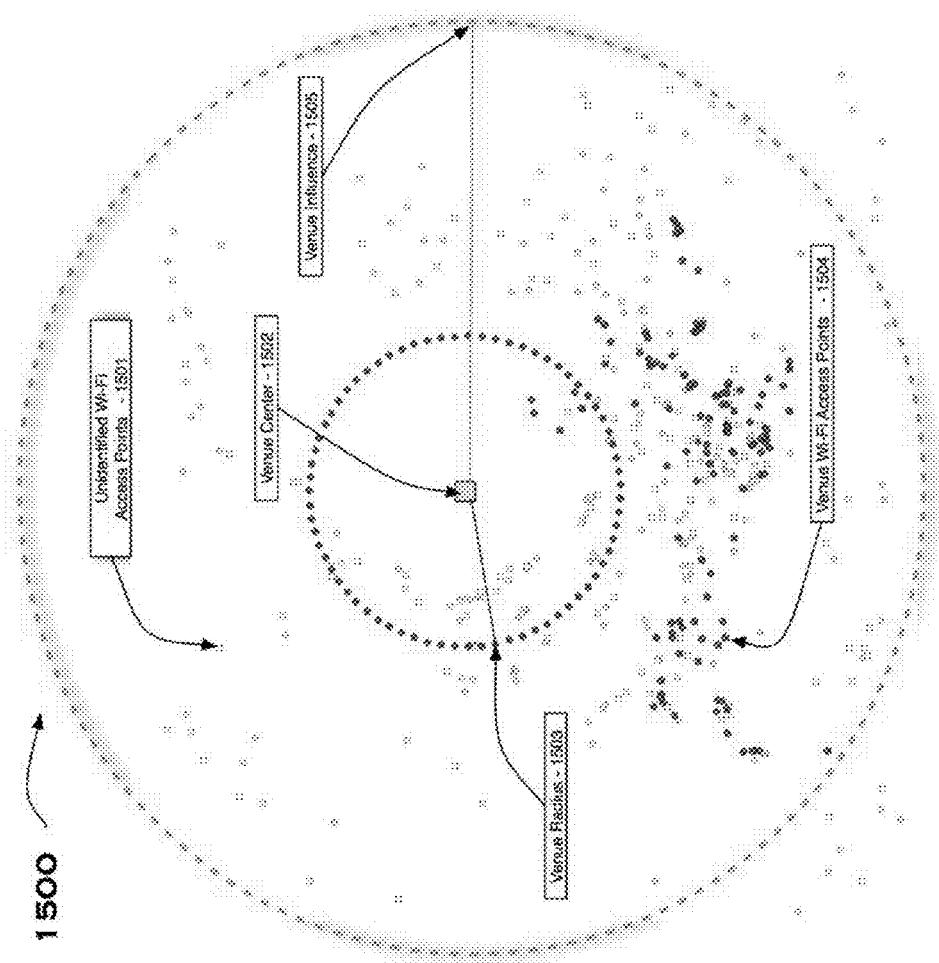
FIG. 15 shows a diagram with the elements involved in automated venue attribution, according to aspects of the present disclosure.

Referring to FIG. 15, another radius is next chosen to produce the Venue Influence [1505]. This larger radius produces a spatial buffer which represents the area within which we expect to find a majority of the Wi-Fi beacons within any Beacon database that is used for positioning. The radius for the Venue Influence is based on the expected accuracy of the position of the Wi-Fi beacons within the positioning database.

FIG. 15 depicts the situation where many Wi-Fi beacons are discovered [1501, 1504] when the spatial buffer is applied to a search within the Beacon database. From the full set of discovered beacons, a clustering algorithm is executed. This clustering algorithm attempts to find a class of beacons that are self-similar. The primary method for measuring similarity is to use a subset of the MAC address for clustering. For example the Organizational Unique Identifier (OUI) prefix of the MAC address which consists of the first 3 octets for MAC-48 and EUI-48, or first 5 octets in the EUI-64 Extended Unique Identifier format. These OUI's are assigned to individual manufacturers of Wi-Fi access points and equipment. Clustering on the OUI or some other subset of the MAC clusters similar devices based on the manufacturer's method of numbering their devices. Using this technique, organizations that deploy Wi-Fi gear primarily from cluster-identified vendors will make their individual branch or venue locations discoverable across the entire geographic coverage area of the Beacon database.

The algorithm may require a threshold based on the number of access points in the largest cluster. This may also be compared against the next largest cluster of self-similar beacons. In an alternate embodiment, the algorithm may require a certain percentage of all visible beacons to be within the primary cluster.

Referring to FIG. 15, the clustering algorithm was able to identify a set of beacons that clustered [1504], identified in the figure as those with filled in diamonds. The beacons that did not cluster [1501] are identified as hollow boxes in FIG. 15.

Figure 16:
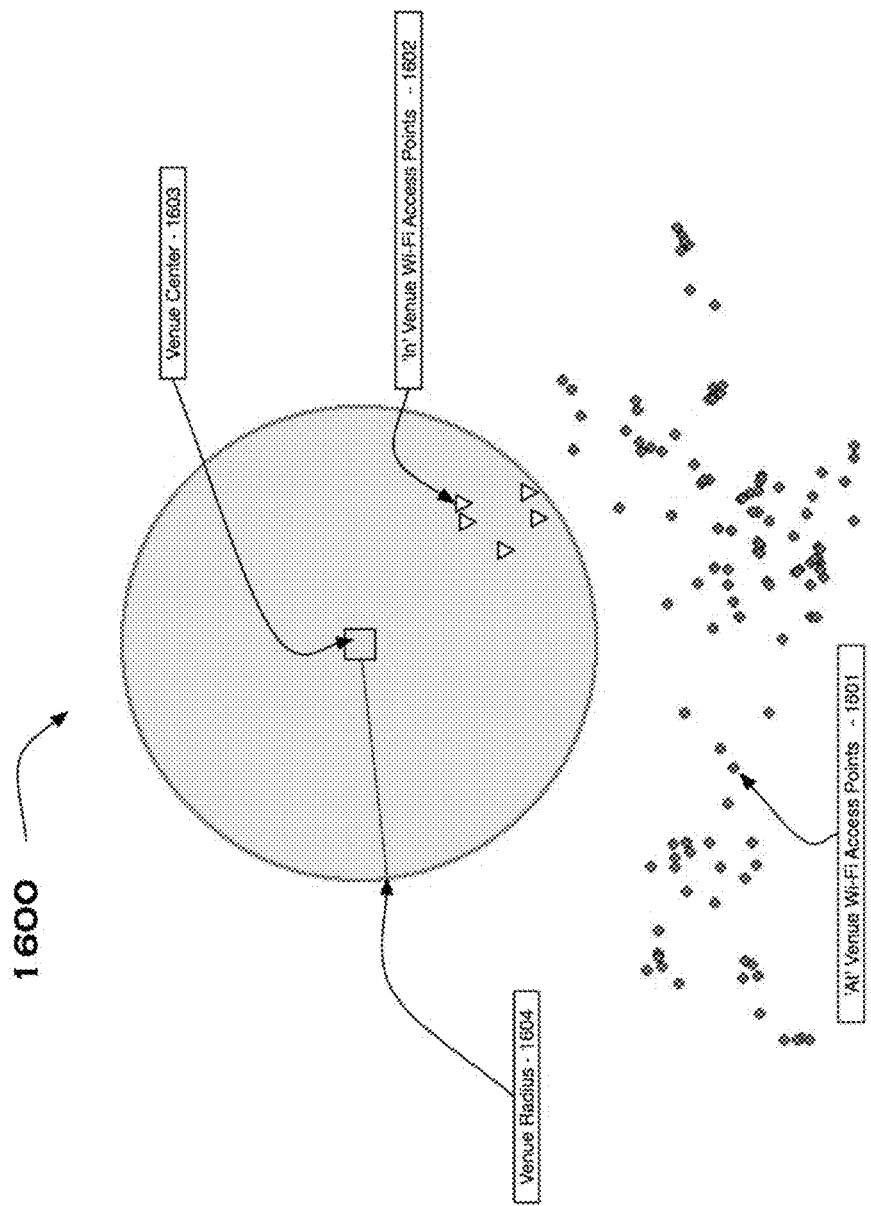
FIG. 16 shows a diagram depicting a group of beacons assigned to a specific venue.

In one embodiment of the algorithm, the process proceeds as depicted in FIG. 16. The cluster of beacons are split into two groups, the "In" venue and the "At" venue beacons. Beacons that are spatially within the Venue Radius [1604] from the Venue Center [1603] are considered to be "in" the venue [1602], identified by a hollow triangle. An extended attribute for those beacons indicating this fact is set to true. The remaining beacons that were identified within the cluster are set to indicate that these beacons are "at" the venue [1601], identified by a filled-in diamond. All beacons identified as part of the cluster have their extended place attributes set to the values associated with the venue itself. These attributes may include the civic address of the venue, the name of the venue, owner of the venue, the size of the venue, the hours of operation of the venue, and any other attribute that is associated with the venue itself.

Figure 17:
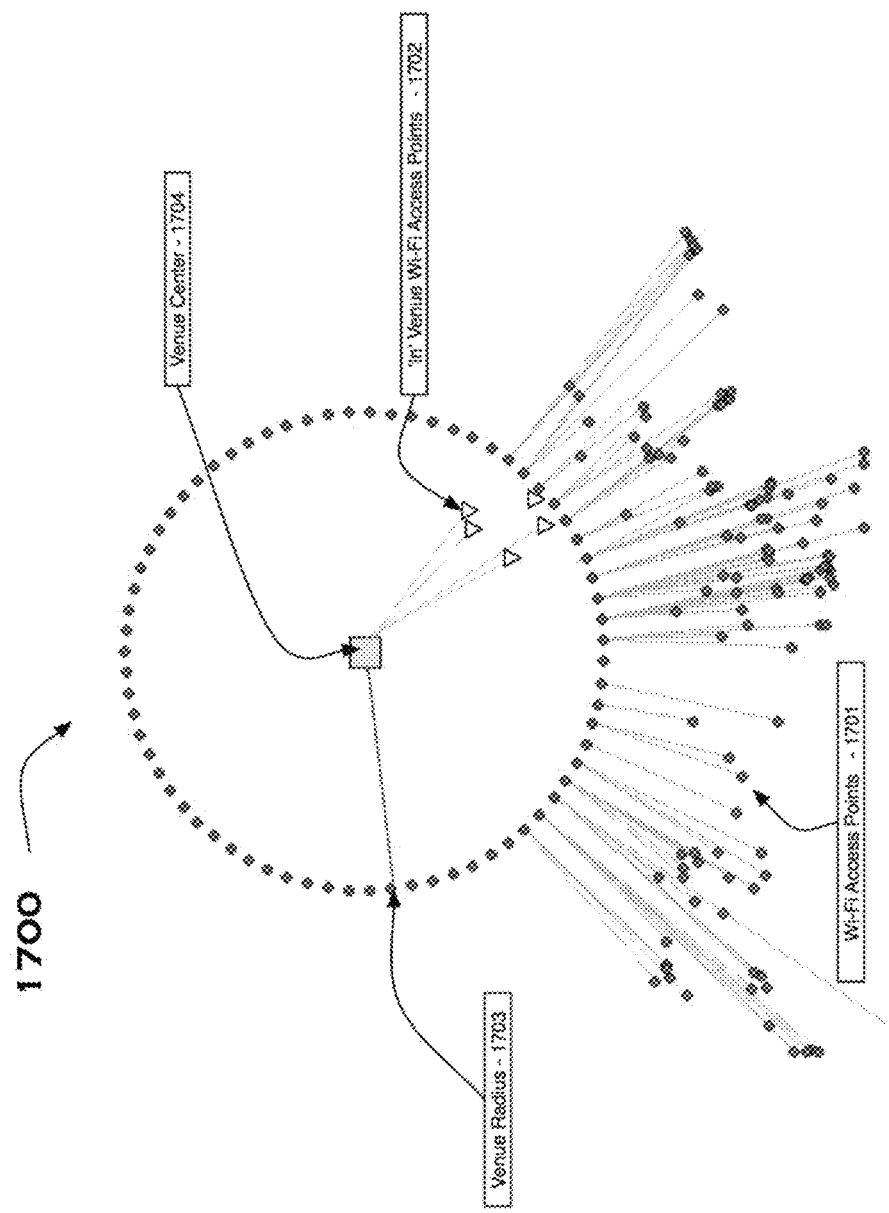
FIG. 17 shows an example of assigning different attributes to sets of venue beacons.

FIG. 17 depicts the activity above showing the semantic effect of setting these attributes on the set of beacons. Those within the Venue Radius [1703] are now considered inside the venue [1702]. Those beacons outside of the Venue Radius [1703] are now considered at the venue [1701].

4. System Overview

Figure 20:
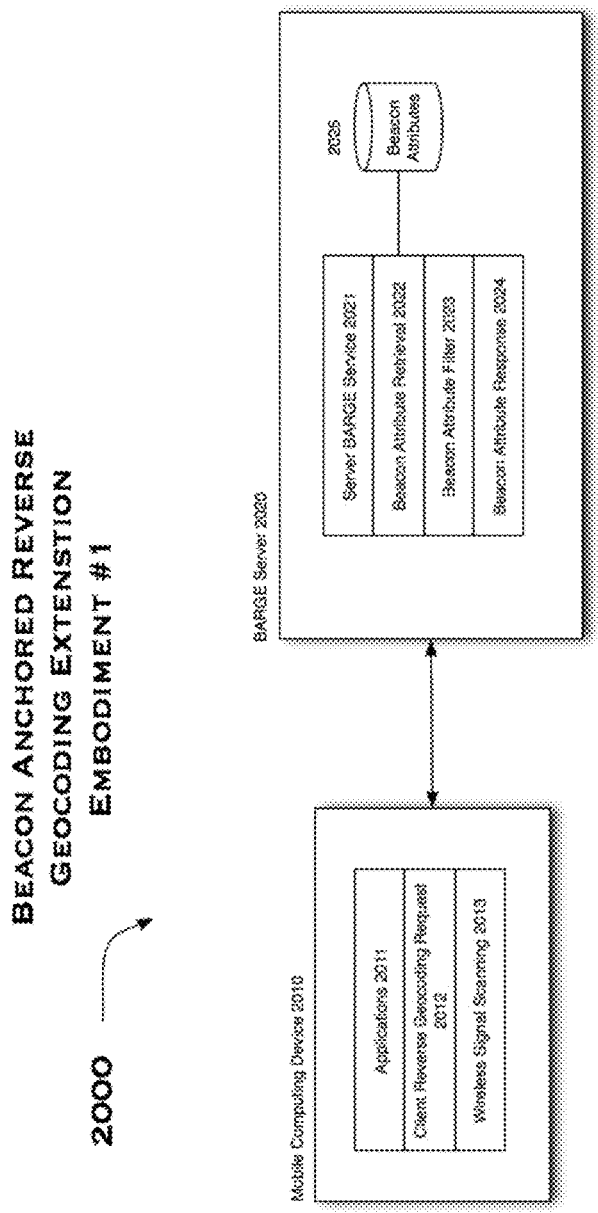
FIG. 20 illustrates one physical embodiment of the invention.
Figure 21:
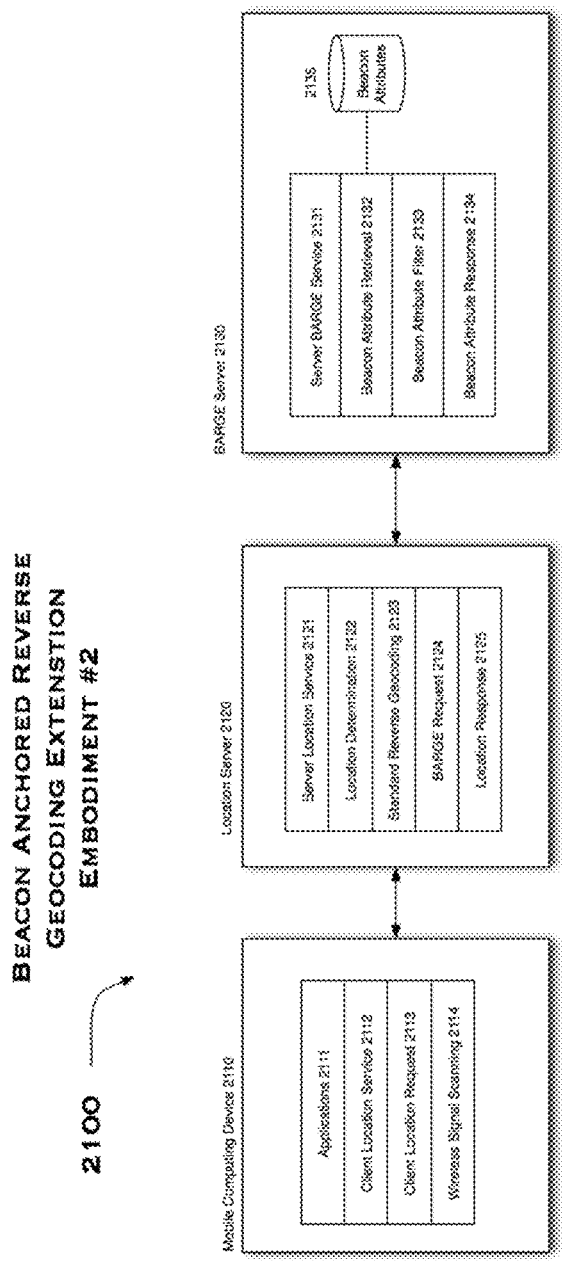
FIG. 21 illustrates a second physical embodiment of the invention.
Figure 22:
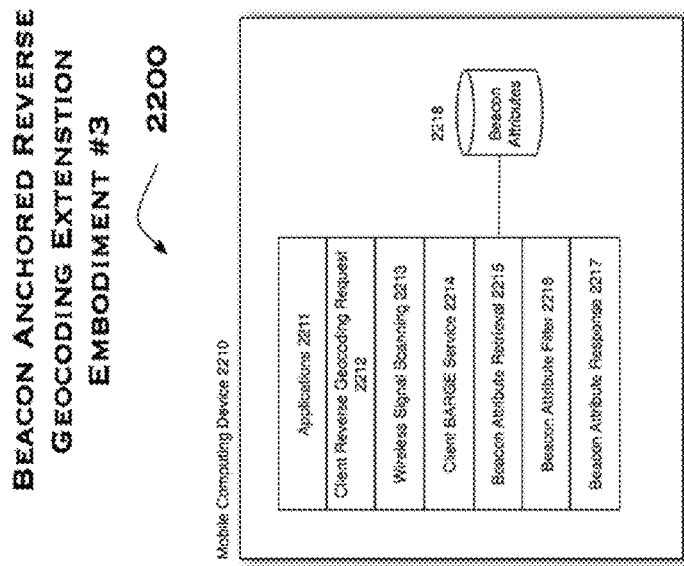
FIG. 22 illustrates a third physical embodiment of the invention.

FIGS. 20, 21 and 22 depict exemplary physical embodiments of the BARGE system. FIG. 20 illustrates a physical embodiment wherein the BARGE system interacts directly with the client device. Referring to FIG. 20, a mobile computing device [2010] includes applications [2011] which require extended reverse geolocation information. The application [2011] requests extended reverse geocoding by invoking the Client Reverse Geocoding Request [2012] component which in turn invokes the Wireless Signal Scanning component [2012] which retrieves beacon id(s) as well as their respective received signal strength(s). The gathered wireless signal information is packaged by the client Reverse Geocoding Request process [2012] and performs a network request to the BARGE Server [2020]. The BARGE Service [2021] receives the request from the mobile computing device [2010]. Beacon Attribute Retrieval [2022] retrieves the available attribute(s) for the one or more beacons from the Beacon Attributes database [2025]. From this complete set of attributes and values, the Beacon Attribute Filter component [2023] performs a set of algorithms such as clustering and string matching combined with signal strength information to derive the set of attributes and values that are most likely to describe the location of the mobile device. This set of attributes and values are then sent back to the mobile device to be used by the requesting application [2011].

FIG. 21 illustrates a physical embodiment of the invention in which the BARGE system is included as a component of a Location Server [2100]. Referring to FIG. 21, a mobile computing device [2110] includes applications [2111] which require location information with extended reverse geolocation information. According to embodiments of the present disclosure, the application [2111] invokes a client Location Service [2112] which in turn invokes the Wireless Signal Scanning [2113] component. The wireless signal information, retrieved by the Wireless Signal Scanning [2113], is packaged in a communication that is sent from the Client Location Request [2114] to the Server Location Service [2121] on the Location Server [2120]. The Server Location Service [2121] invokes the Location Determination component [2122] to perform the necessary computations for location determination.

The computed geographic location is then used by the Standard Reverse Geocoding component [2123] to compute the reverse geocoding attributes for the given location (e.g. latitude and longitude). The gathered wireless signal information as well as any returned standard reverse geocoding attributes are packaged by the BARGE Request component [2124] and sent to the Server BARGE Service [2131] on the BARGE Server [2130]. The Beacon Attribute Retrieval [2132] retrieves the available attribute(s) for the one or more beacons from the Beacon Attributes database [2135]. From this complete set of attributes and values, the Beacon Attribute Filter component [2133] performs a set of algorithms, for example, clustering and string matching combined with signal strength information to derive the set of attributes and values that are most likely to describe the location of the mobile device. This set of attributes and values are then sent back to the Location Server [2120] and included in the response to the mobile device by the Location Response component [2125].

FIG. 22 illustrates a physical embodiment of the invention in which components of the BARGE system are deployed onto the Mobile Computing Device [2210]. Referring to FIG. 22, an Application [2211] requests extended reverse geocoding attribute by invoking the Client Reverse Geocoding Request [2212] component. [2212] invokes the Wireless Signal Scanning [2213] component which retrieves beacon id(s) as well as their respective received signal strength(s) and passes this information to the Client BARGE Service [2214]. The Client BARGE Service [2214] invokes the Beacon Attribute Retrieval [2215] which retrieves the available attribute(s) for the one or more beacons from the Beacon Attributes database [2218]. From this complete set of attributes and values, the Beacon Attribute Filter component [2216] performs a set of algorithms such as clustering and string matching combined with signal strength information to derive the set of attributes and values that are most likely to describe the location of the mobile device. This set of attributes and values are then sent back to the application [2011] by the Beacon Attribute Response [2217] component.

Figure 13:
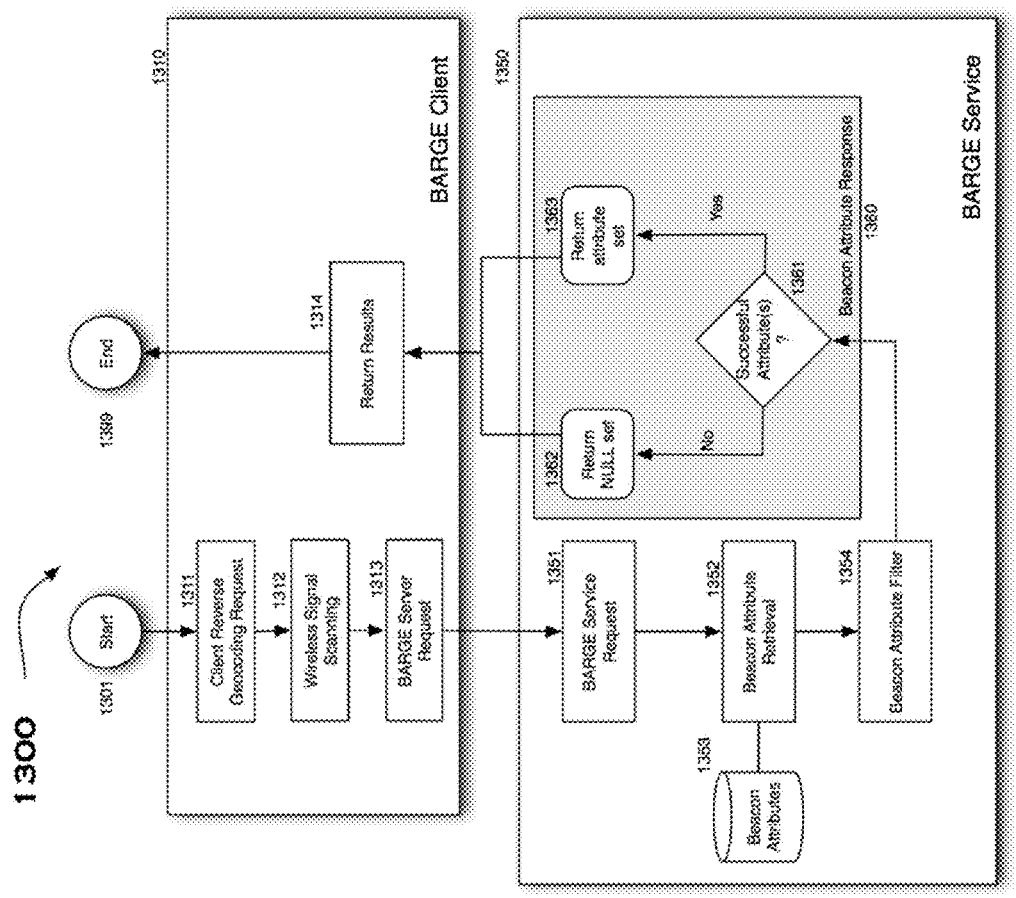
FIG. 13 shows a flow diagram of the overall BARGE system and the interaction with the client device, according to aspects of the present disclosure.
Figure 14:
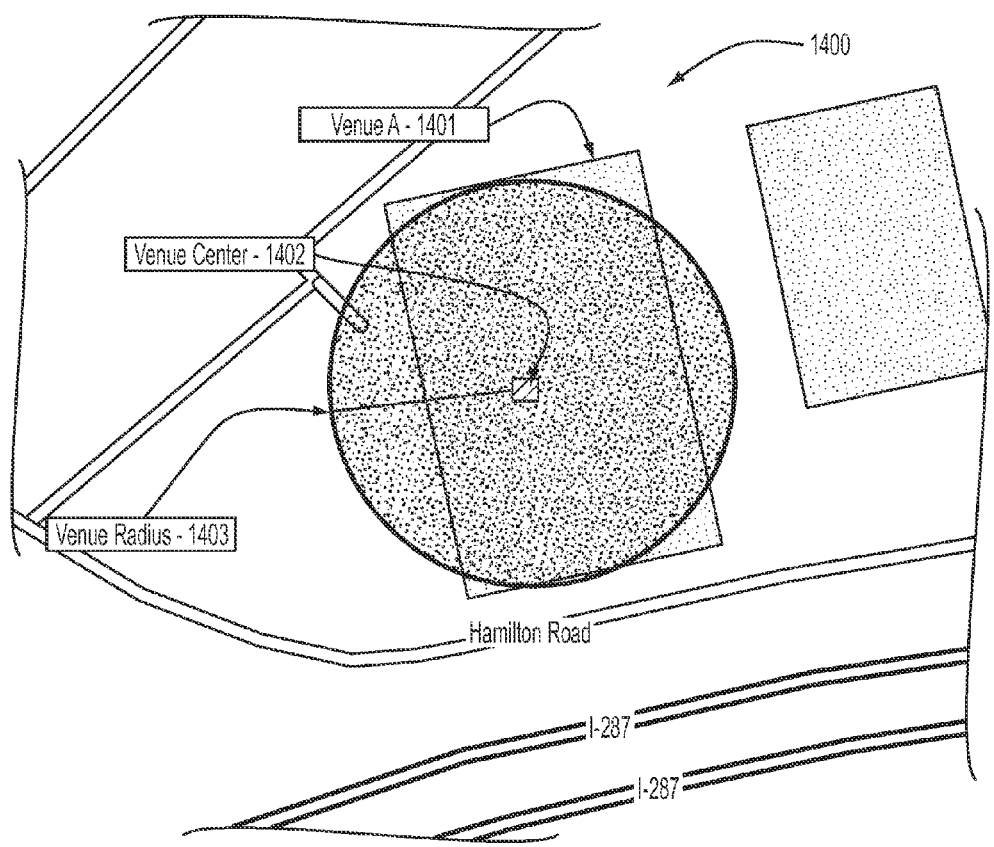
FIG. 14 shows an exemplary BARGE system usage scenario of an automated attribute assignation for a venue.

FIG. 13 describes an exemplary process flow including interactions between the BARGE Client [1310] software and the BARGE Service [1350] software.

Figure 3:
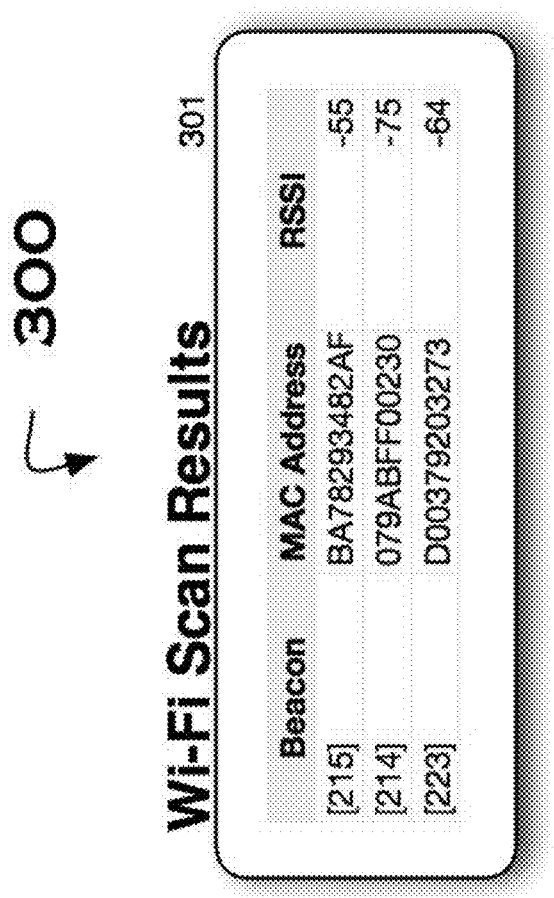
FIG. 3 shows exemplary results of a client device radio beacon scan.

According to aspects of the invention, the Client Reverse Geocoding Request [1311] is invoked at the Start [1301]. The Wireless Signal Scanning [1312] component is invoked to scan for wireless beacons. The set of scanned beacons, for example as shown in FIG. 3, [301], are sent along with a request for place information [1313] to the BARGE Service [1350]. The BARGE Service Request [1351] accepts the request and begins processing the request. Using the set of beacons that were submitted [301], the attributes are retrieved from the Beacon Attributes database [1353] by the Beacon Attribute Retrieval [1352] component. The retrieved attributes and any additional information provided by the client [1310] are processed by a set of filters and clustering algorithms within the Beacon Attribute Filter [1354] to choose the most appropriate attribute or attributes to describe the place where the client device is located The Beacon Attribute Response [1360] makes a determination [1361] whether any attributes were successfully determined based on the set of chosen filters. If no attributes were successfully chosen, a NULL set is returned [1362] to the client. Otherwise, the set of successfully resolved attributes are returned to the client [1363]. The client receives the set of NULL or successful attributes [1314] and returns the results [1314] to a calling process and stops [1399].

5. Client Device Interaction with the BARGE System

Preferred embodiments of the invention allow a client device, such as a mobile phone, to request information from the BARGE system. Input to the BARGE system may include, for example, the following information for each beacon: Beacon Key and Received Signal Strength or equivalent. In one embodiment, this information would represent the MAC Address and the Received Signal Strength (RSSI) of all of the Wi-Fi access points that are within range of the client device.

FIG. 3 provides an example of input information that may be provided by the user device [301].

In one embodiment, additional input information may include, for example, the location (latitude, longitude and optional altitude) of the client device and the error estimate for the given location.

In another embodiment, the location and error estimate may be provided by a positioning system.

FIG. 1 depicts an exemplary embodiment of the overall process flow for a complete positioning system. In this figure, a client device [101] makes a request to a positioning system [110]. The positioning system first determines the location of the client device, for example, by using a Beacon database [115]. The system then performs a Basic Reverse Geocoding function [112] using reverse geocoding data [116]. Following this, the system performs an Extended Reverse Geocoding function [113] using beacon attributes and beacon signal information obtained by the client [117]. The system then returns a location including any extended attributes computed by the BARGE System [114].

6. Determining Resultant Attribute Set

In order to return appropriate typology based on a set of beacon keys and signal strengths, an algorithm must first determine the best fit and choose the appropriate set of attributes to return.

In the preferred embodiment, the invention makes use of at least a set of beacon keys and the respective signal strengths received at the client device. It may accept additional information including the approximate location of the device, the estimated error for the given location, and the civic address based on the provided location.

In general, any given algorithm implemented to provide this capability must first determine if any of the beacons in the list have extended typological attributes. If attributes exist, the algorithm must then determine if the device is likely to be "close" to one or more of these beacons. From this set of candidate beacons, it must choose the "best fit" beacon(s) and then it must choose the appropriate typological attributes to return.

Each of these steps can be implemented to use all or some of the optional input values as well as implementing specific functionality and computations based on the need of the system.

In one embodiment of the invention, a "room level" filter is applied on the set of beacons scans to determine if room information should be returned to the client based on the maximum signal strength of the beacons as calculated by the client device.

7. Determining Resultant Attribute Set—Room Algorithm 1

Figure 4A:
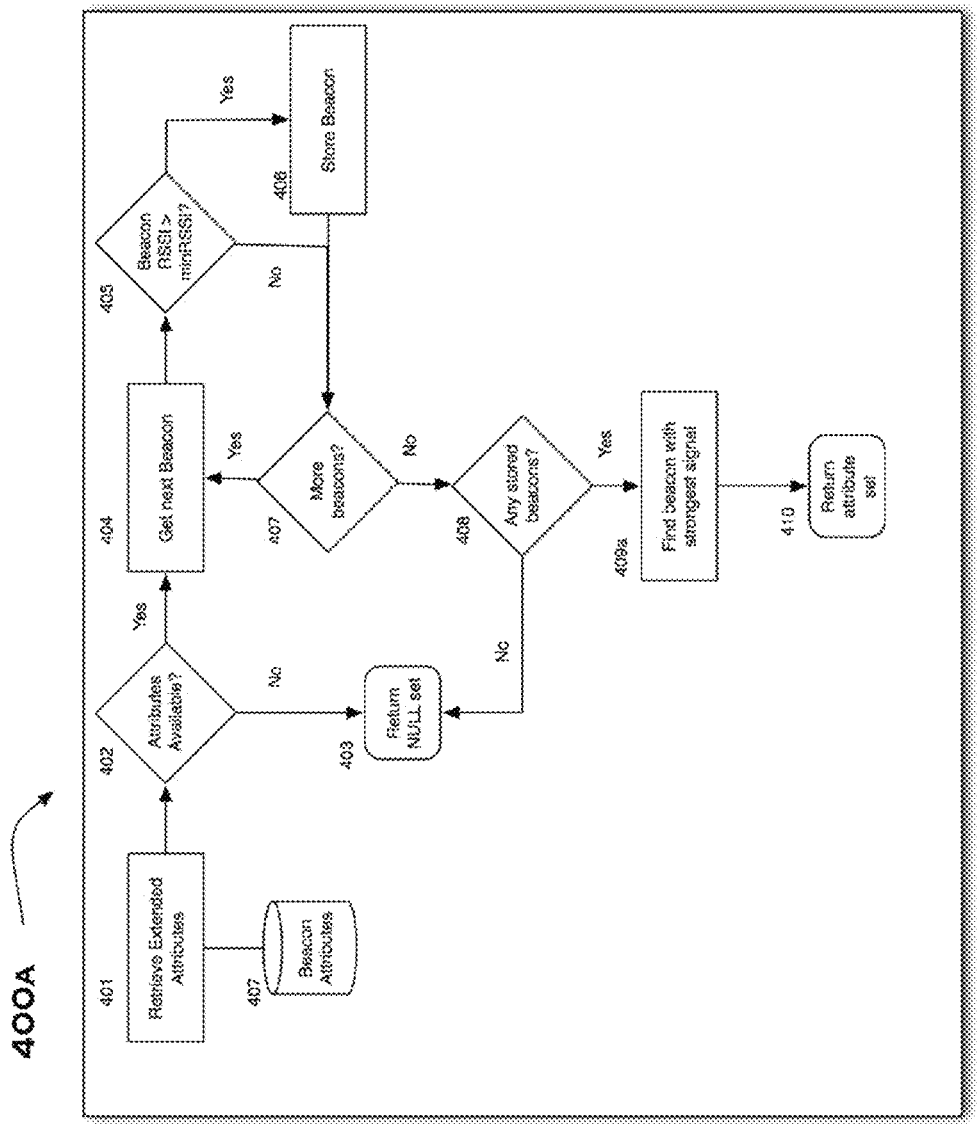
FIGS. 4A and 4B show exemplary flow charts for estimating room level attribute selection.
Figure 4B:
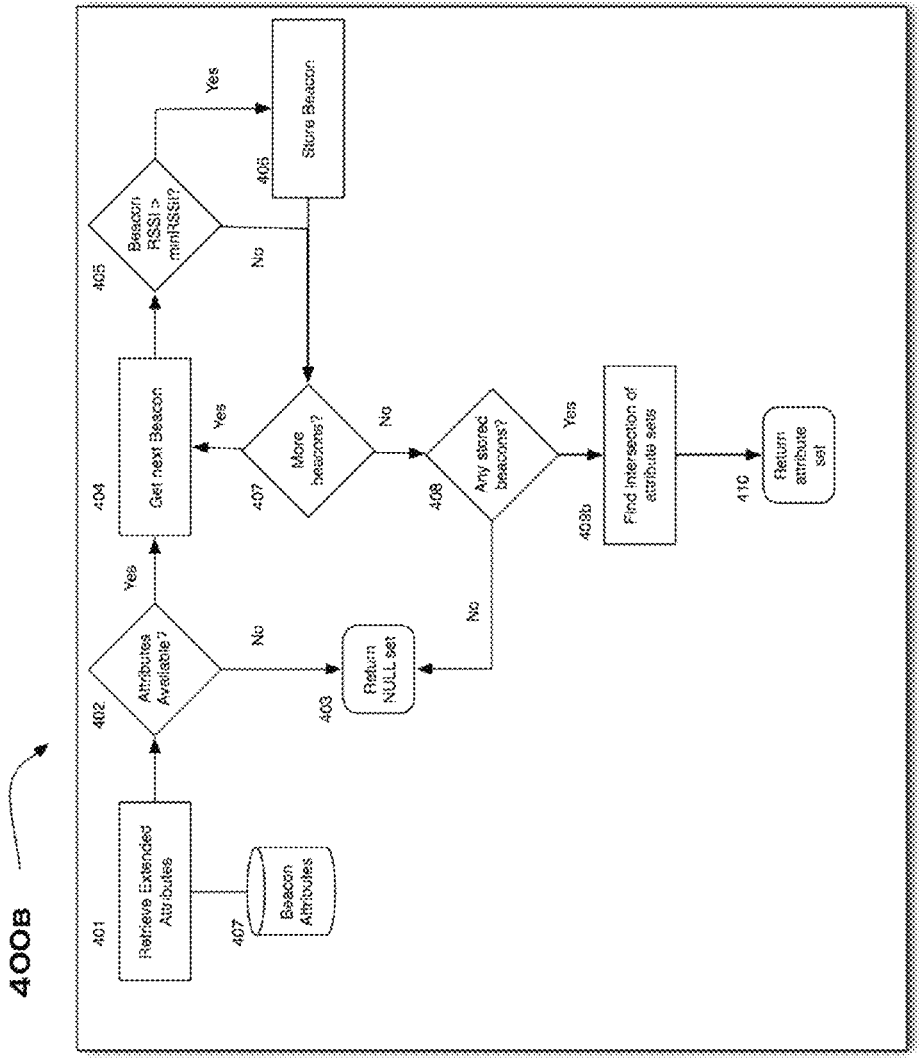

FIGS. 4A and 4B describe the process flows for performing two exemplary embodiments of the "room level" filter.

The following pseudo-code and description depicts one embodiment of the algorithm to determine room-level attribute selection. In this embodiment, a minimum signal strength (minRssi) is pre-determined to define room-level based on signal propagation properties such as the Free Space Path Loss formula. This provides a minimum signal strength that is required to meet the room level requirement. In one embodiment the minRssi is set as:

minRssi=MIN_RSSI_ROOM_ADDRESS=−60

Referring to FIG. 4, [401] determines which beacons have attributes by querying the database [407]. An example query to retrieve a specific set of attributes:

BeaconList=SELECT key,venue,description,organization,administrator,building,area,room,floor FROM Attributes WHERE key IN(<list of keys>)

Figure 5:
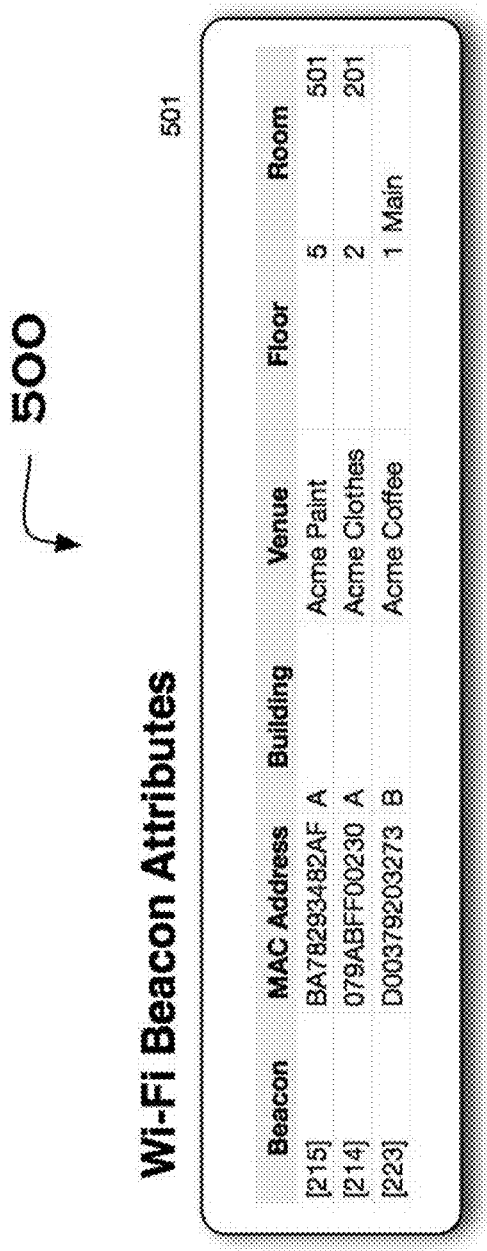
FIG. 5 shows exemplary beacon attribute database records.

FIG. 5 depicts a sample set of returned attributes from the database including possible attributes of Building, Venue, Floor, and Room [501].

Referring to FIG. 4A, if no attributes were found [402], the NULL set is returned [403]. Otherwise, the beacon information including the attributes are passed to [404]. Each beacon is then tested against the minRssi [405]. If the beacon passes the test, then the beacon and associated attributes are stored [406] and the process continues [407] until all the beacons have been processed.

Pseudocode for this step:

```
for each beacon : BeaconList {
    if (beacon.Rssi > minRssi) {
        RoomBeaconList.add(beacon)
    }
}       //For the given example (see Fig. 3), the RoomBeaconList would contain only MAC BA78293482AF as its RSSI is greater than −60 [301].
```

If no beacons passed the test [408], a NULL set is returned [403].

Figure 6:
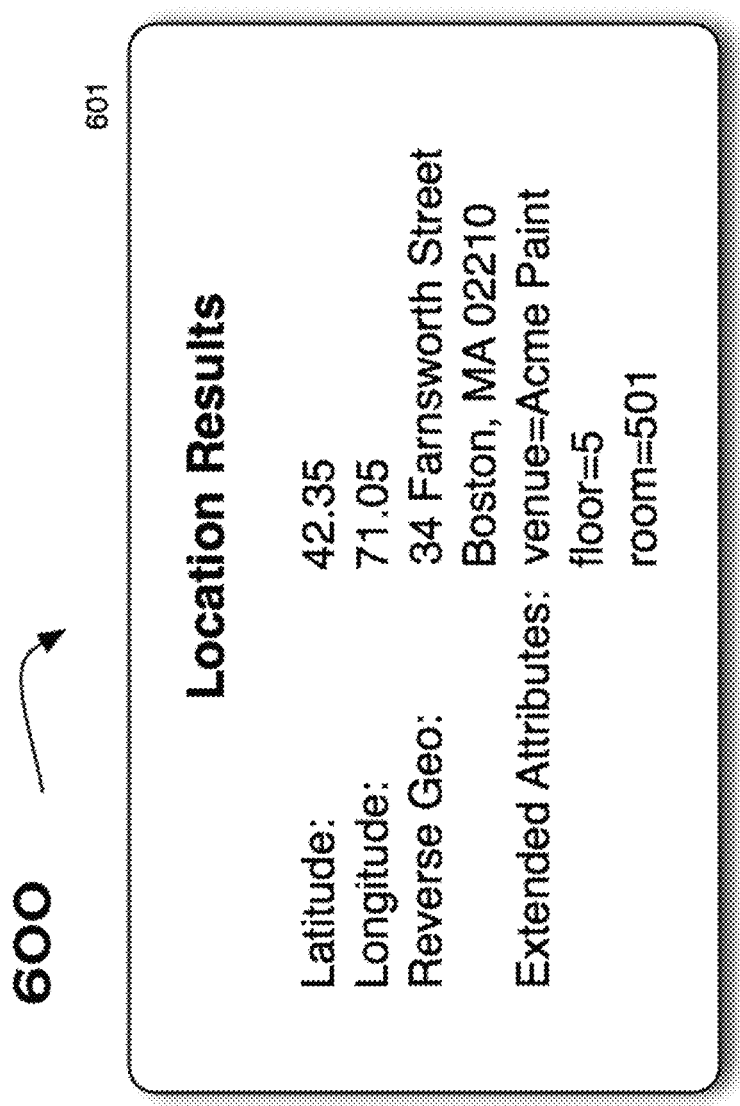
FIG. 6 shows an exemplary response from a combined positioning, reverse geocoding, and Beacon Anchored Reverse Geocoding Extension (BARGE) system.

Next, the process finds the closest beacon from this list [409a]:

attributeList=RoomBeaconList·maxRssiAttributes( );

Based on the example depicted in FIG. 3, the closest beacon would contain information about MAC BA78293482AF as it is the only beacon in the list that would survive the test. The process would then return the attributes from MAC BA78293482AF and would then provide the information as indicated in FIG. 6, Location Results [601].

8. Determining Resultant Attribute Set—Room Algorithm 2

According to alternative embodiment, an algorithm for "room level" identification is based on a set of strong signal strengths.

In this example, the algorithm is similar to algorithm 1, discussed above, except the attribute set that is returned is based on a function of the combined set of attributes. For example, if multiple beacons are determined to be within the desired distance (minRssi), the combination of returned attributes can be used to choose the appropriate set to return.

Figure 7:
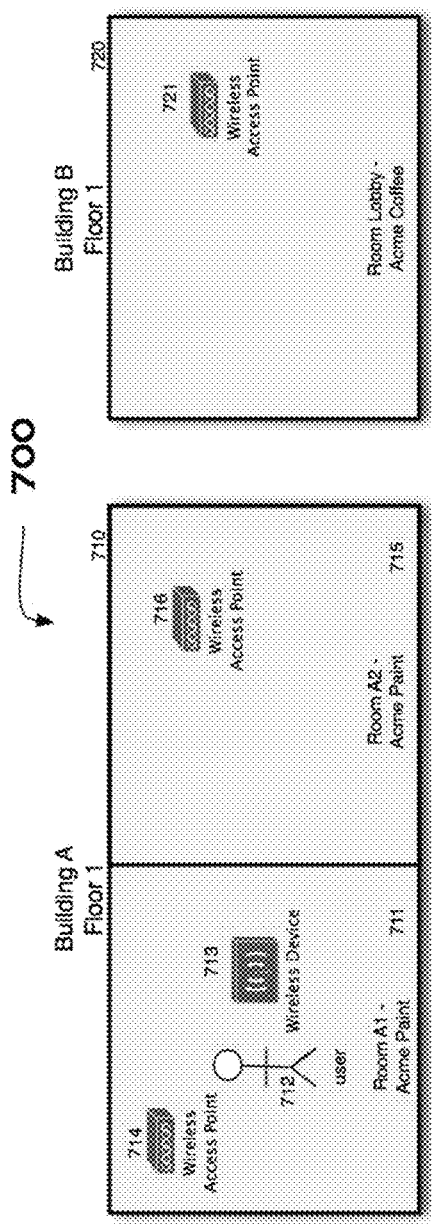
FIG. 7 shows a BARGE system usage scenario consisting of several buildings with multiple rooms, according to aspects of the present disclosure.

One example function to combine the attributes would be the "intersection( )" function as detailed below. FIG. 7 depicts an arrangement for this example.

Figure 8:
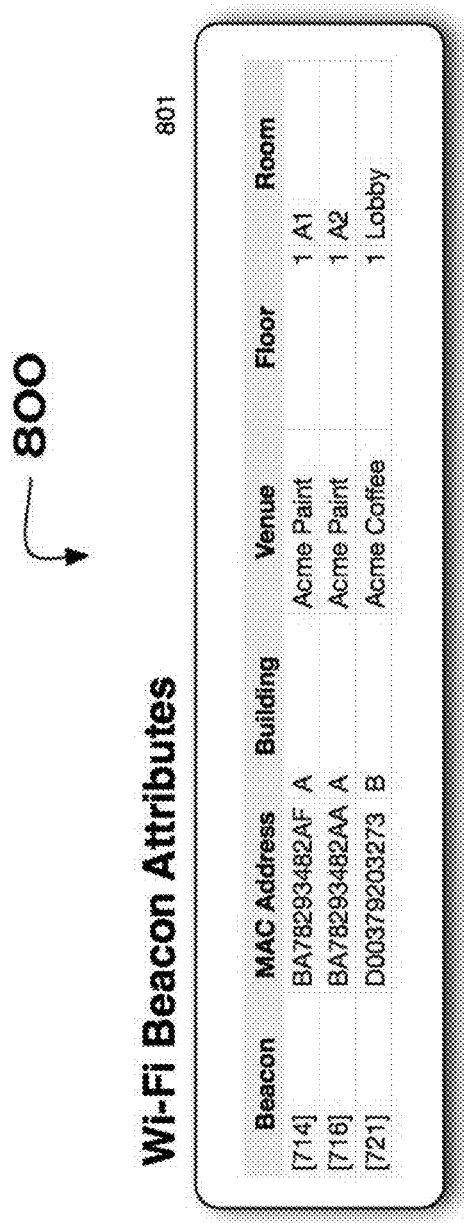
FIG. 8 shows an exemplary set of beacon attribute records.
Figure 9:
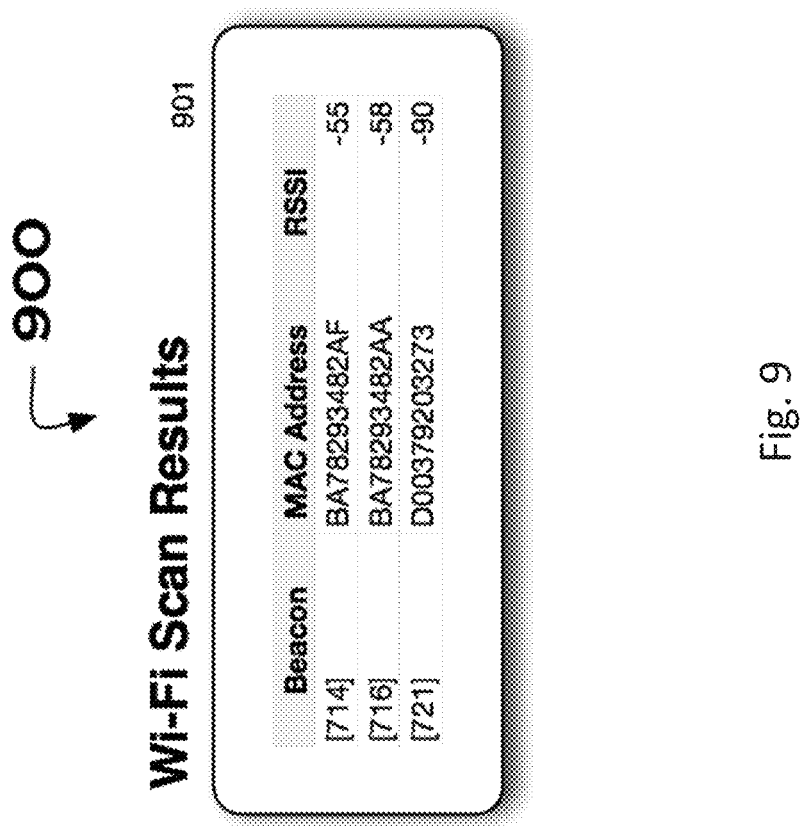
FIG. 9 shows an exemplary client device beacon scan.

FIG. 8 illustrates the beacon attributes used to illustrate the invention using algorithm 2. This shows a scenario in which a user with a mobile device is on the 1st floor of a building (Building A [710]), in room A1 [711] containing an access point [714]. Located in the same building on the same floor is another access point [716] located in room A2 [715]. Near Building A is another building, Building B [720]. Building B contains an access point [721] on the 1st floor.

Preferred returned results from a location service would include, for example, the identification of Building A (latitude and longitude), the identification of the venue (Acme Paint), the identification of the floor (Floor 1), and the identification of the room. In this scenario, the intersection of attributes for qualified beacons will be returned using the following steps. The room number will not be returned.

Referring to FIG. 4B, [401] determines which beacons have attributes by querying the database [407]. An example query to retrieve a specific set of attributes:

BeaconList=SELECT key,venue,description,organization,administrator,building,area,room,floor FROM Attributes WHERE key IN(<list of keys>)

FIG. 5 depicts a sample set of returned attributes from the database including possible attributes of Building, Venue, Floor, and Room [501].

Referring to FIG. 4B, if no attributes were found [402], the NULL set is returned [403]. Otherwise, the beacon information including the attributes are passed to [404]. Each beacon is then tested against the minRssi [405], if it passes the test the beacon and associated attributes are stored [406] and the process continues [407] until all the beacons have been processed.

Pseudocode for this step:

```
for each beacon : BeaconList {
    if (beacon.Rssi > minRssi) {
        RoomBeaconList.add(beacon)
    }
}       //For the given example (see Fig. 3), the RoomBeaconList would contain only MAC BA78293482AF as its RSSI is greater than −60 [301].
```

If no beacons passed the test [408], a NULL set is returned [403].

Given the criteria that the minRssi is −60, the resulting list (RoomBeaconList) will contain two beacons [714, 716].

Figure 10:
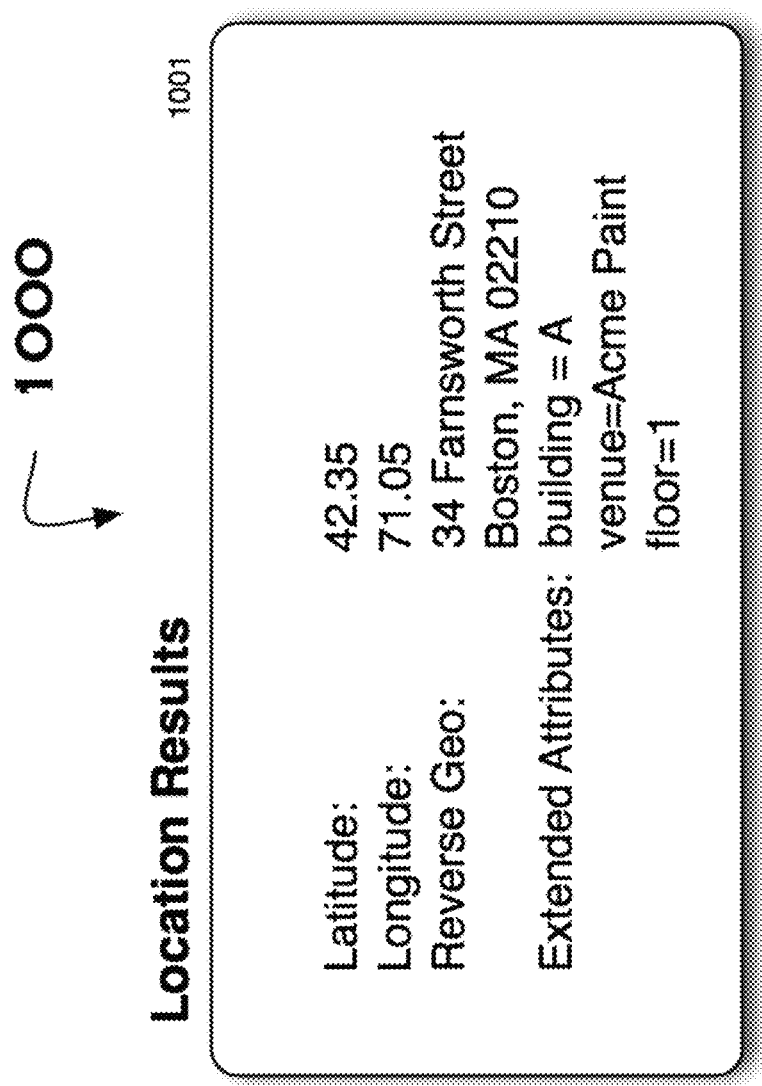
FIG. 10 shows exemplary expected location results, according to aspects of the present disclosure.

Next, the process finds the intersection of attributes from the beacons in this list [409b]:

attributeList=RoomBeaconList·intersectingAttributes( );

Referring to FIG. 10, the qualifying extended attributes which are the same for both AP [714] and [716] are indicated in the Extended Attributes in [1001].

Both algorithms described above can be modified in a number of ways to accommodate different requirements. In alternative embodiments, the minRssi can be set to a specific level to identify a 'common' size based on the granularity of results desired. An example would be setting the room level using a minimum RSSI of −60. In fact, the minRssi can be dynamically set based on a number of external factors.

The setting of the minRssi can be adjusted based on the requested scope of typological information (e.g. exhibit, room, building, neighborhood, etc.). For example if the specificity or granularity of the positional attribute requires a particular spatial accuracy, the minRssi can be set based on the distance propagation of radio signals. Thus, for room level accuracy, the minRssi may need to be −60, however for a building level attribute set, −70 may be sufficient.

Additionally, the minRssi can be adjusted based on building footprint information. The threshold can be dynamically calculated by examining the size of the building or rooms in the selected building. For example, if building level determination indicates a warehouse, the building wall and wall material information can be retrieved to adjust the necessary signal strength to be indicative of a signal emanating from a particular room of the building.

The type of beacon (Wi-Fi, Cell, signal frequency, etc.) can also be consulted for dynamically adjusting the minRssi threshold. For example, due to the different propagation properties of the different frequencies, the required signal strength for each of these may be different to account for distance to signal strength conversions.

The type of device making requests (sensitivity, antenna configuration, etc.) may also require the minRssi to be dynamically set. Different devices may have a higher or lower radio sensitivity. This may require the algorithm to adjust the minRssi based on this sensitivity.

The minRssi may need to be adjusted based on knowledge about the signal propagation of a given beacon. For example, if it is known that a particular beacon's signal is only seen in a specific room, that information can be used to increase confidence. Another example might be, given the knowledge that a particular beacon's signal is only seen within 20 meters of the beacon, an appropriate bounding area can be computed and thus more detailed and/or higher confidence can be returned by the system.

9. Determining Resultant Attribute Set—Additional Algorithms

In another embodiment of the invention, the set of attributes to be returned can be based on a requested set of features. For example, if the client device is only interested in particular attributes the devise asks for. Reducing the attribute set can increase performance and reduce resource consumption.

According to alternative embodiments, the disclosed systems and methods return only the basic civic address set. For example, if the application would not be able to handle additional attributes than the standard set, the algorithm would only return those attributes that the client device can accept.

In another embodiment, attributes from beacons that match some element from the standard reverse geolocation service could be returned. For example, to increase the confidence in the returned attributes the attributes that were compatible between both the standard reverse geocoding system and the BARGE system would be returned.

10. Returning Results to a Client Device

The output payload from the BARGE system can be able to provide the new extended reverse geolocation data elements. There are several approaches to providing this capability.

In one embodiment, every possible type of information is predetermined by the system. For example, a partial set could include: 'building', 'room', and 'floor'. New types or classes of "place" information would then need to be explicitly within the system.

In another embodiment of the invention, an extensible set of name-value pairs are used to express the extended attributes. Thus, each beacon contains both the names of its attributes as well as the values for each of the related attributes. This model allows easy expansion, but reduces commonality of attribute names across beacons without some external control over the introduction of attributes into the data set.

In yet another embodiment, the system uses a tagging system, in which the attributes are not named, but rather the beacon contains a number of unnamed characteristics or tags that identify the beacon's location. This provides an unstructured list of values that can be associated with a given beacon.

These different embodiments provide various benefits and offer their own set of constraints. In general, the flexibility of the above models increase going down the list, while the specificity and commonality of attributes is reduced in the same order.

It should be noted that a full address payload could be contained in the attribute set, thus obviating the need for an additional reverse geocoding system where sufficient beacon attributes exist in the data set.

It will be appreciated that the scope of the present invention is not limited to the above-described embodiments, but rather is defined by the appended claims, and these claims will encompass modifications of and improvements to what has been described. For example, embodiments have been described as having a client-server architecture. However, embodiments of the invention can be implemented in the user's mobile device, in which the mobile device contains the access point location data and performs all techniques needed to determine the user's location.

What is claimed is:

1. In a system in which there is a reference database of wireless beacons that stores attributes associated with the wireless beacons, a method for providing contextual information about a place within a range of a wireless signal beacon, the method comprising:
   at least one of the wireless-enabled device and a server system in communication with the wireless-enabled device receiving information identifying at least one wireless beacon in range of the wireless-enabled device;
   determining a received signal strength indication of the at least one wireless beacon;
   at least one of the wireless-enabled device and the server system in communication with the wireless-enabled device retrieving from the reference database extended attributes that are associated with the at least one wireless beacon;
   at least one of the wireless-enabled device and a server system in communication with the wireless-enabled device determining at least one associated contextual attribute about the place within range of the at least one wireless beacon.

2. The method of claim 1, wherein the determining of the at least one contextual attribute is based on the received signal strength indication of the at least one wireless beacon.

3. The method of claim 1, wherein the determining of the at least one contextual attribute is based on the received signal strength indication of the at least one wireless beacon and a clustering algorithm.

4. The method of claim 1, wherein the determining of the at least one contextual attribute is based on the received signal strength indication of the at least one wireless beacon and an approximate string match algorithm.

5. The method of claim 4, wherein the determining of the at least one contextual attribute further includes use of standard reverse geocoding attributes.

6. The method of claim 1, wherein the determining of the at least one contextual attribute is further based on at least one of an estimated location of the wireless-enabled device, an estimated error of the location of the wireless-enabled device, latitude and longitude coordinates of the place, and an address of the place.

7. The method of claim 1, wherein the at least one contextual attribute includes at least one of a civic address of a venue, a name of the venue, an owner of the venue, a size of the venue, and hours of operation of the venue.

8. The method of claim 1, wherein the at least one contextual attribute includes at least one of a room number, an office number, a building name, a wing name, a floor number, an exhibit name, a bus number, and a business name.

9. A server system for providing contextual information about a place within a range of a wireless signal beacon, the server system in communication with a reference database of wireless beacons that stores extended attributes associated with the wireless beacons, the server system comprising:
receiving means for receiving from a wireless-enabled device in communication with the server system information identifying at least one wireless beacon in range of the wireless-enabled device, a wireless beacon identifier and a received signal strength indication of the at least one wireless beacon in range of the wireless-enabled device;
retrieving means for retrieving from the reference database extended attributes that are associated with the at least one wireless beacon;
determining means for determining at least one associated contextual attribute about the place within range of the at least one wireless beacon.

10. The system of claim 9, wherein the determining the at least one associated contextual attribute is based on at least one of a received signal strength indication of the at least one wireless beacon, an estimated location of the wireless-enabled device, an estimated error of the location of the wireless-enabled device, latitude and longitude coordinates of the place, and an address of the place.

11. The system of claim 9, wherein the determining of the at least one contextual attribute is based on the received signal strength indication of the at least one wireless beacon and a clustering algorithm.

12. The system of claim 9, wherein the determining of the at least one contextual attribute is based on the received signal strength indication of the at least one wireless beacon and an approximate string match algorithm.

13. The system of claim 12, wherein the determining of the at least one contextual attribute further includes use of standard reverse geocoding attributes.

14. The system of claim 9, wherein the at least one contextual attribute includes at least one of a civic address of a venue, a name of the venue, an owner of the venue, a size of the venue, and hours of operation of the venue.

15. The system of claim 9, wherein the at least one contextual attribute includes at least one of a room number, an office number, a building name, a wing name, a floor number, an exhibit name, a bus number, and a business name.

16. A method for maintaining a reference database of beacons and associated place attributes, the method comprising:
estimating a geographic location of at least one beacon;
defining a spatial buffer around the estimated location of the at least one beacon;
identifying at least one point of interest (POI) within the spatial buffer;
comparing the at least one POI with the Service Set Identification (SSID) of the at least one beacon using an approximate string matching algorithm;
entering an associated place attribute corresponding to the at least one beacon based on the comparison of the at least one POI with the SSID.

17. The method of claim 16, wherein the spatial buffer is an arbitrary 2-dimensional or 3-dimensional polygon.

18. The method of claim 16, wherein the spatial buffer is a circle.

19. The method of claim 16, wherein the spatial buffer is a sphere.

20. A method for automated acquisition and association of place attributes with beacons for use in a reference database, the method comprising:
defining at least one point of interest and a first spatial boundary for the at least one point of interest;
defining a second spatial boundary representing an area of influence for each point of interest, wherein the area of influence is determined by the expected signal reach of wireless beacons from within the first spatial boundary;
retrieving from the reference database information identifying wireless beacons that are located within the second spatial boundary;
performing a clustering algorithm on beacon identifiers that are located within the second spatial boundary;
defining a cluster based on the performed clustering algorithm, the cluster containing identified wireless beacons; and
assigning associated point of interest attributes as place attributes to each identified wireless beacon in the defined cluster.

21. The method of claim 20, further comprising:
classifying the clustered wireless beacons as "inside a point of interest" if the set of clustered beacons are within the first spatial boundary;
classifying the remaining clustered beacons as "at the point of interest"; and
assigning a new attribute to the place attribute database for all clustered beacons.

* * * * *